(12) United States Patent
Blitz

(10) Patent No.: US 8,353,108 B2
(45) Date of Patent: Jan. 15, 2013

(54) UTENSIL AND METHOD FOR RETRIEVING AND APPLYING SPREADABLE FOOD

(76) Inventor: Bruce Blitz, Cherry Hill, NJ (US)

( * ) Notice: Subject to any disclaimer, the term of this patent is extended or adjusted under 35 U.S.C. 154(b) by 296 days.

(21) Appl. No.: 12/660,601

(22) Filed: Mar. 2, 2010

(65) Prior Publication Data

US 2011/0214291 A1    Sep. 8, 2011

(51) Int. Cl.
*A47J 43/28* (2006.01)
(52) U.S. Cl. .............. 30/142; 30/128; 100/234
(58) Field of Classification Search .......... 30/142, 30/368, 324–328, 147, 149, 150, 120.3, 128, 30/125, 146; 100/234, 2; 294/99.2; D7/667
See application file for complete search history.

(56) References Cited

U.S. PATENT DOCUMENTS

| | | | | |
|---|---|---|---|---|
| 1,708,456 A | * | 4/1929 | Tunick | 30/326 |
| 1,866,487 A | * | 7/1932 | Ritter, Jr. | 100/213 |
| 1,875,678 A | * | 9/1932 | Thate | 100/213 |
| 2,455,623 A | * | 12/1948 | Stone | 30/123 |
| 2,674,793 A | * | 4/1954 | Dominick | 30/150 |
| 3,027,826 A | * | 4/1962 | Morris | 100/133 |
| 3,596,965 A | * | 8/1971 | Woofter | 294/8 |
| 4,069,752 A | * | 1/1978 | Ahner | 100/112 |
| 4,466,346 A | * | 8/1984 | Gemelli | 100/112 |
| 5,491,897 A | * | 2/1996 | Michelena | 30/328 |
| 2007/0284899 A1 | * | 12/2007 | Simons | 294/99.2 |

* cited by examiner

*Primary Examiner* — Laura M. Lee
(74) *Attorney, Agent, or Firm* — Stuart M. Goldstein

(57) ABSTRACT

A utensil has first and second arm members of substantially the same size and shape. Each arm member has a head section and a handle section. The head sections are concave or scoop-like in configuration and are connected by a rotatable hinge which permits rotation of the arm members in relation to each other. The head section of the first arm members has elongated openings through which spreadable food can be expelled. The head section of the second arm member is solid. With the first arm member nested within the second arm member, spreadable food is scooped onto the utensil, specifically on the top surface of the first arm member. Rotation of the second arm member around the first arm member such that the second arm member is now nested within the first arm member, causes the food to be expelled from the openings in the first arm member, where the food can be easily spread on bread and or food items.

3 Claims, 4 Drawing Sheets ature, are best understood upon review of the following detailed description with reference to the accompanying drawings.

UTENSIL AND METHOD FOR RETRIEVING AND APPLYING SPREADABLE FOOD

BACKGROUND OF THE INVENTION

There are a variety of commonly used utensils of various configurations which are utilized to scoop peanut butter out of jars, butter, butter-like products, and margarine out of tubs, cream cheese out of containers, and similar spreadable food out of their respective receptacles. Spoons, ice cream-type scoops, and even knives are utilized to retrieve food from such containers. However, these utensils are often inefficient and even ineffective in scooping more solidified items, such as peanut butter or butter, when they are refrigerated. And once retrieved from their containers, only knives are generally effective for spreading. However, the limited usefulness of knives in the actual scooping and retrieval of the refrigerated food from their containers makes them less than satisfactory overall.

There is thus currently no single device which combines the characteristics of a food scoop with that of a food spreader, into an all in one utensil to efficiently and effectively accomplish food retrieval and food spreading operations.

SUMMARY OF THE INVENTION

It is thus the object of the present invention to provide a utensil which overcomes the limitations and disadvantages of existing food scoop, retrieval, and food application utensils.

It is an object of the present invention to provide a utensil which combines the characteristics of a food scoop with that of a spreader into one handy, convenient, utensil.

It is another object of the present invention to provide a utensil which is easy to use and is most effective in scooping and retrieving food and then, contemporaneously, spreading that food on bread, rolls, and other foodstuffs.

It is a further object of the present invention to provide a utensil which is easily cleaned.

It is another object of the present invention to provide a utensil which has relatively few parts and so would be relatively easy and economical to manufacture.

These and other objects are accomplished by the present invention, a utensil having first and second arm members of substantially the same size and shape. Each arm member has a head section and a handle section. The head sections are concave or scoop-like in configuration and are connected by a rotatable hinge which permits rotation of the arm members in relation to each other. The head section of the first arm members has elongated openings through which spreadable food can be expelled. The head section of the second arm member is solid. With the first arm member nested within the second arm member, spreadable food is scooped onto the utensil, specifically on the top surface of the first arm member. Rotation of the second arm member around the first arm member such that the second arm member is now nested within the first arm member, causes the food to be expelled from the openings in the first arm member, where the food can be easily spread on bread and or food items.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 1:
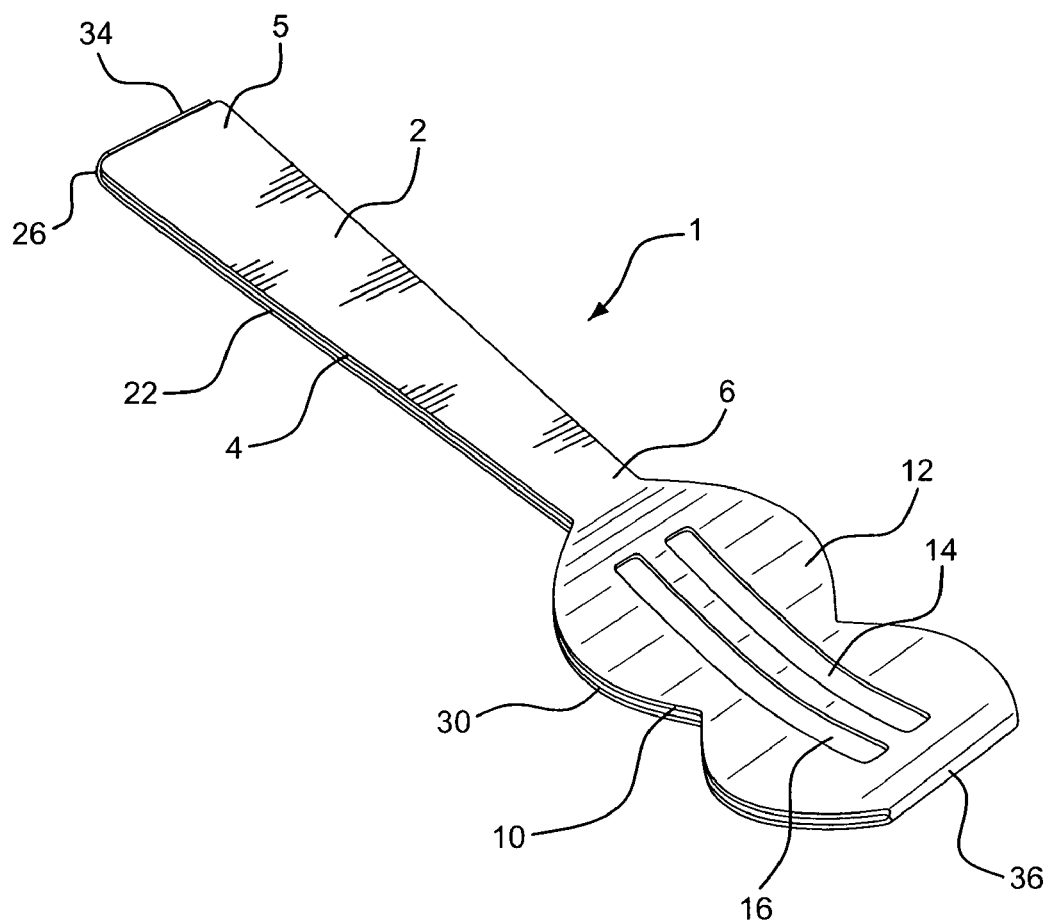
FIG. 1 is a perspective view of the utensil of the present invention, in its pre-use position.

Utensil 1 of the present invention comprises arm member 2 having handle section 4 with ends 5 and 6. Curved head section 10 extends from end 6 of handle section 4. Head section 10 has bottom surface 11 and top surface 12 which are both concave in relation to handle section 4. Head section 10 further comprises elongated openings 14 and 16 which extend through the head section.

Arm member 22 has handle section 24 having ends 26 and 28. Curved head section 30 extends from end 28 of handle section 24. Head section 30 has bottom surface 31 and top surface 32 which are concave in relation to handle section 24. In fact, arm member 22 is substantially the same shape and size as arm member 2; with the exception being that arm member 22 is incrementally longer than arm member 2 and it has resilient, upstanding lip 34 extending from end 26 of its handle section 24. In addition, unlike head section 10 of arm member 2, head section 30 of arm member 22 has a continuous solid surface, uninterrupted by openings.

Both head section 10 and head section 30 are shown as peanut shaped in the drawings, however, the invention should not be considered restricted to the shape of the head section. Any scoop-like configuration may be utilized for this section of utensil 1.

A flexible, rotatable hinge 36 connects arm members 2 and 22 at their respective head sections 10 and 30. Hinge 36 is configured to allow rotational movement between the arm members.

Figure 2:
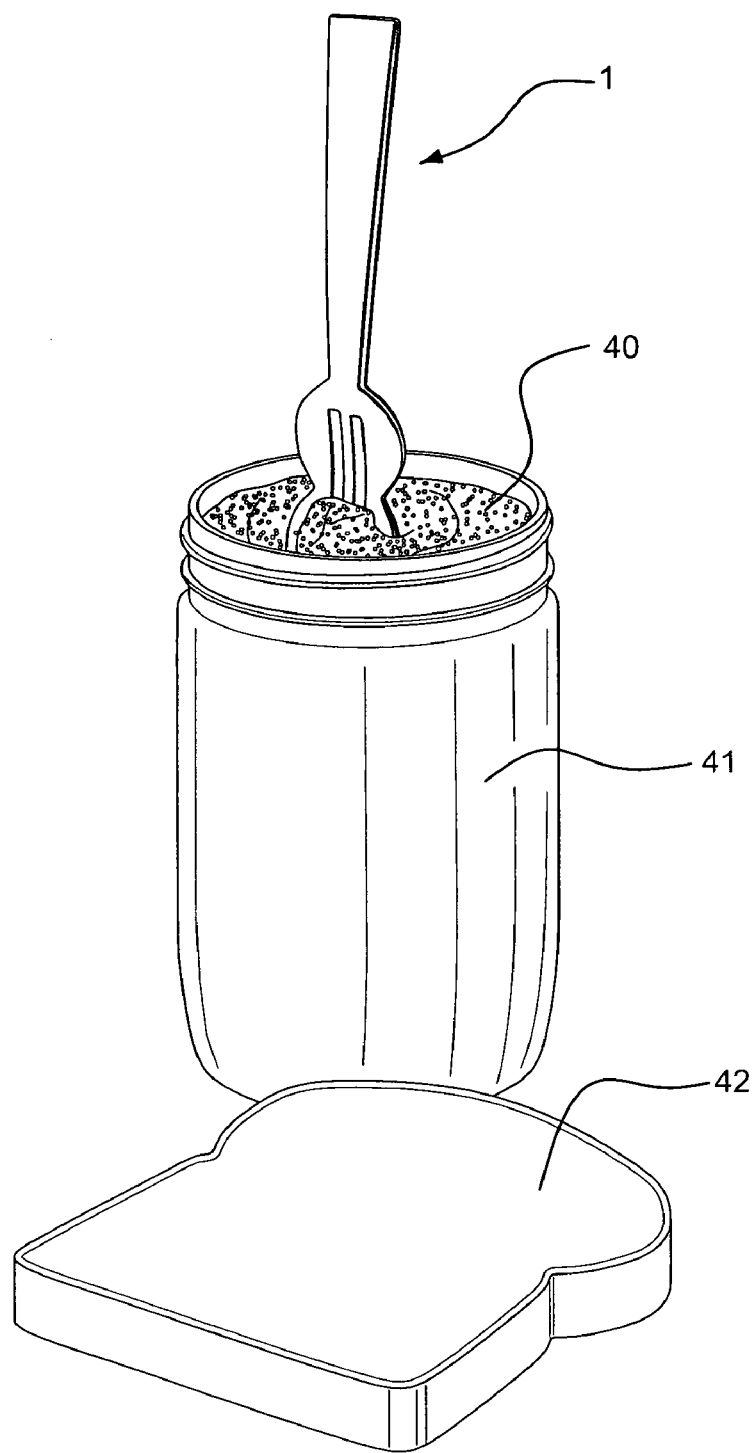
FIG. 2 is a view of the utensil of the utensil of the present invention being used to scoop food, e.g. peanut butter.
Figure 3:
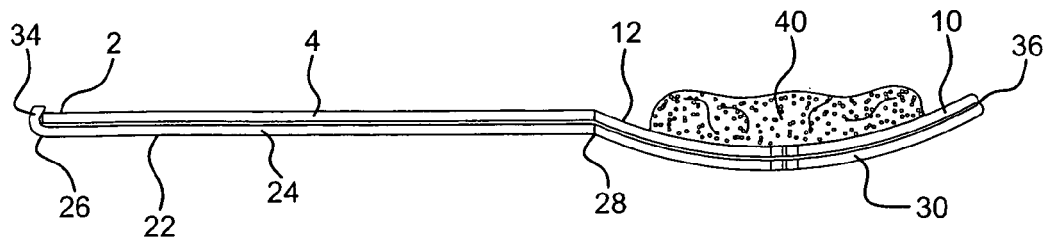
FIG. 3 shows an elevation view of the utensil of the present invention, after food has been scooped onto its head sections.
Figure 4:
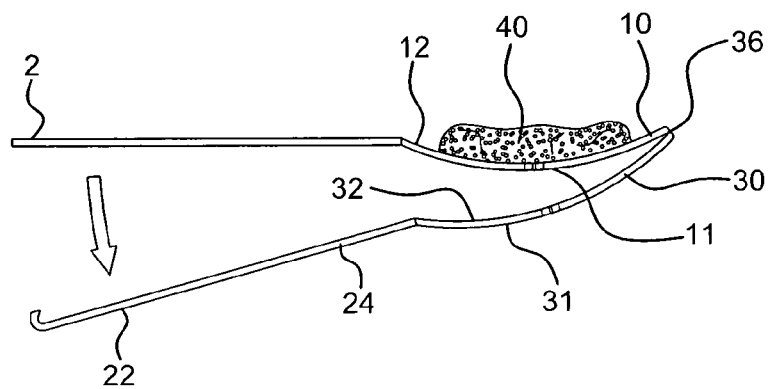
FIG. 4 depicts the first step in the use of the utensil of the present invention.
Figure 5:
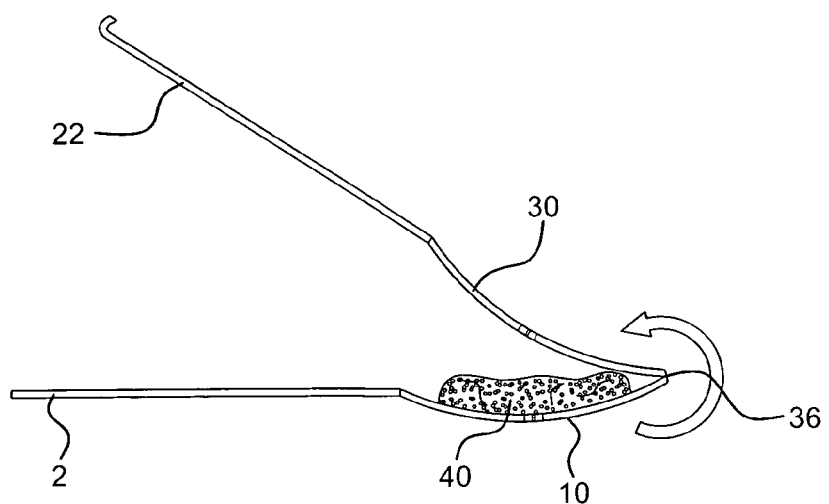
FIG. 5 depicts the next step in the use of the utensil of the present invention.
Figure 6:
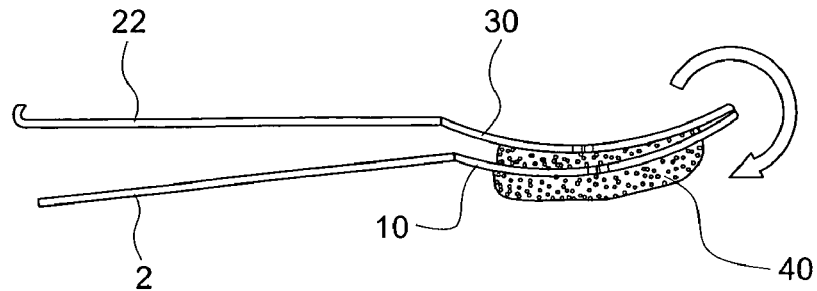
FIG. 6 depicts the next step in the use of the utensil of the present invention.
Figure 7:
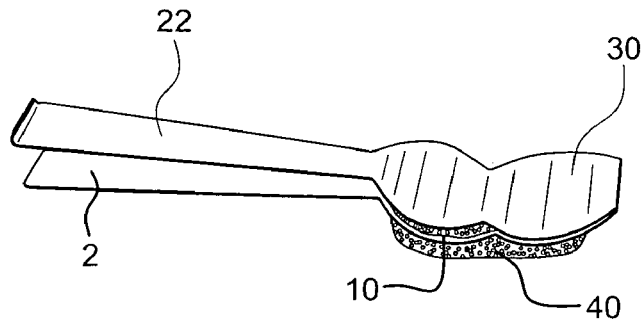
FIG. 7 is a perspective view of the utensil of the present invention shown in FIG. 6.
Figure 8:
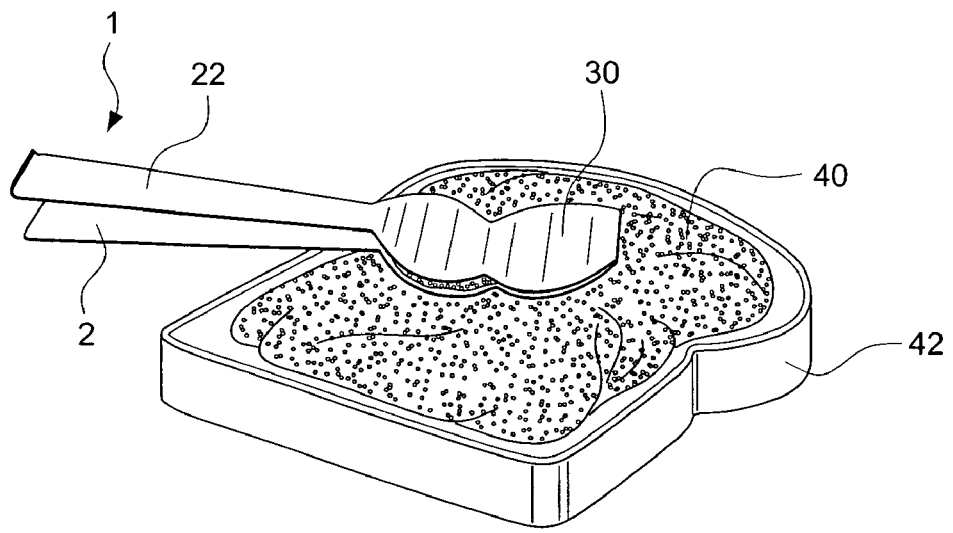
FIG. 8 shows the utensil of the present invention as a food applicator/spreader.

The operation of utensil 1 is as follows. Arm members 2 and 22 are aligned adjacent to each other, in scoop position, as shown in FIGS. 1 and 2, with arm member 2 nested within arm member 22. Lip 34 acts as a clasp to maintain arm 2 in position over arm member 22. Utensil 1 is then used to scoop a spreadable food 40 from jar 41 onto top surface 12 of head section 10 of arm member 2. Arm members 2 and 22 are then separated, i.e. they are lifted away from lip 34 and pulled away from each other. As depicted in FIGS. 4-6, arm 22 is then rotated counter-clockwise around hinge 36 until it is directly over top surface 12 of arm member 2. Handle section 24 of arm member 22 is then pressed down onto handle section 4 of arm member 2, so that arm member 22 is nested within arm member 2 into a food spreading position. This downward pressure causes spreadable food 40 on top surface 12 of head section 10 of arm member 2 to be expelled through openings 14 and 16. Spreadable food 40 flows through head section 10 and onto bottom surface 11, from where it is spread on bread, rolls, etc. 42.

After spreadable food 40 on bottom surface 11 is depleted, arm member 22 is rotated clockwise from its food spreading position, back to its original food scoop position, that is, such that arm member 2 is again nested within arm member 22. The food retrieving and application is then repeated, as necessary.

Thus utensil 1 of the present invention provides a versatile, scoop/spreader combination kitchen tool. The present invention not only serves to readily scoop spreadable food, especially more solid foods like refrigerated butter and peanut butter, but is also subsequently available for use to easily and conveniently spread that food.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. The method of retrieving and applying spreadable food comprising the steps of:

providing a utensil with first and second interconnected arm members, each arm member having a scoop section with a top surface;

nesting the first arm member within the second arm member;

scooping spreadable food onto the top surface of the scoop section of the first arm member;

rotating the second arm member in relation to the first arm member;

continuing the rotation of the second arm member in relation to the first arm member until the second arm member is directly over the top surface of the scoop section of the first arm member;

nesting the second arm member within the first arm member;

applying pressure to the second arm member;

expelling spreadable food from the scoop section of the first arm member; and applying the spreadable food.

2. The method as in claim 1 comprising the further step of providing at least one opening within the scoop section of the first arm member for expelling the spreadable food.

3. The method as in claim 1 comprising the further steps of providing handles on the first and second arm members and nesting the second arm member within the first arm member by rotating the handle of the second member in relation to the handle of the first arm member.

* * * * *